United States Patent

Thanayankizil

(10) Patent No.: US 10,015,257 B2
(45) Date of Patent: Jul. 3, 2018

(54) VEHICLE ACCESS POINT SCANNING FOR ACQUIRING NETWORK ACCESS VIA AN EXTERNAL ACCESS POINT

(71) Applicant: GM Global Technology Operations LLC, Detroit, MI (US)

(72) Inventor: Lakshmi V. Thanayankizil, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/222,575

(22) Filed: Jul. 28, 2016

(65) Prior Publication Data

US 2018/0035245 A1 Feb. 1, 2018

(51) Int. Cl.
*H04L 29/08* (2006.01)
*H04W 76/19* (2018.01)
*H04W 4/80* (2018.01)

(52) U.S. Cl.
CPC .............. *H04L 67/12* (2013.01); *H04W 4/80* (2018.02); *H04W 76/19* (2018.02)

(58) Field of Classification Search
CPC ........................................................ H04L 67/12
See application file for complete search history.

(56) References Cited

U.S. PATENT DOCUMENTS

| 9,113,398 B2 | 8/2015 | Dor et al. | |
|---|---|---|---|
| 2007/0294033 A1* | 12/2007 | Osentoski | G08G 1/205 701/29.3 |
| 2012/0039248 A1* | 2/2012 | Schneider | H04W 84/005 370/328 |
| 2015/0084779 A1* | 3/2015 | Saladin | G07C 9/00896 340/686.6 |

* cited by examiner

*Primary Examiner* — Hsin-Chun Liao
(74) *Attorney, Agent, or Firm* — David Willoughby; Reising Ethington P.C.

(57) ABSTRACT

A method of operating a vehicle wireless access point (WAP), including the steps of establishing short range wireless communication between a vehicle WAP and one or more wireless devices over one or more corresponding communication channels operating over a first frequency band; suspending the communication between the vehicle WAP and the wireless device(s); scanning for another non-vehicle WAP using the first frequency band; connecting the vehicle WAP as a client device to the non-vehicle WAP; resuming the communication with at least some of the wireless device(s) over the wireless communication channel(s); and providing the wireless device(s) with data access to remote networks sequentially via both the vehicle WAP and the non-vehicle WAP.

13 Claims, 3 Drawing Sheets

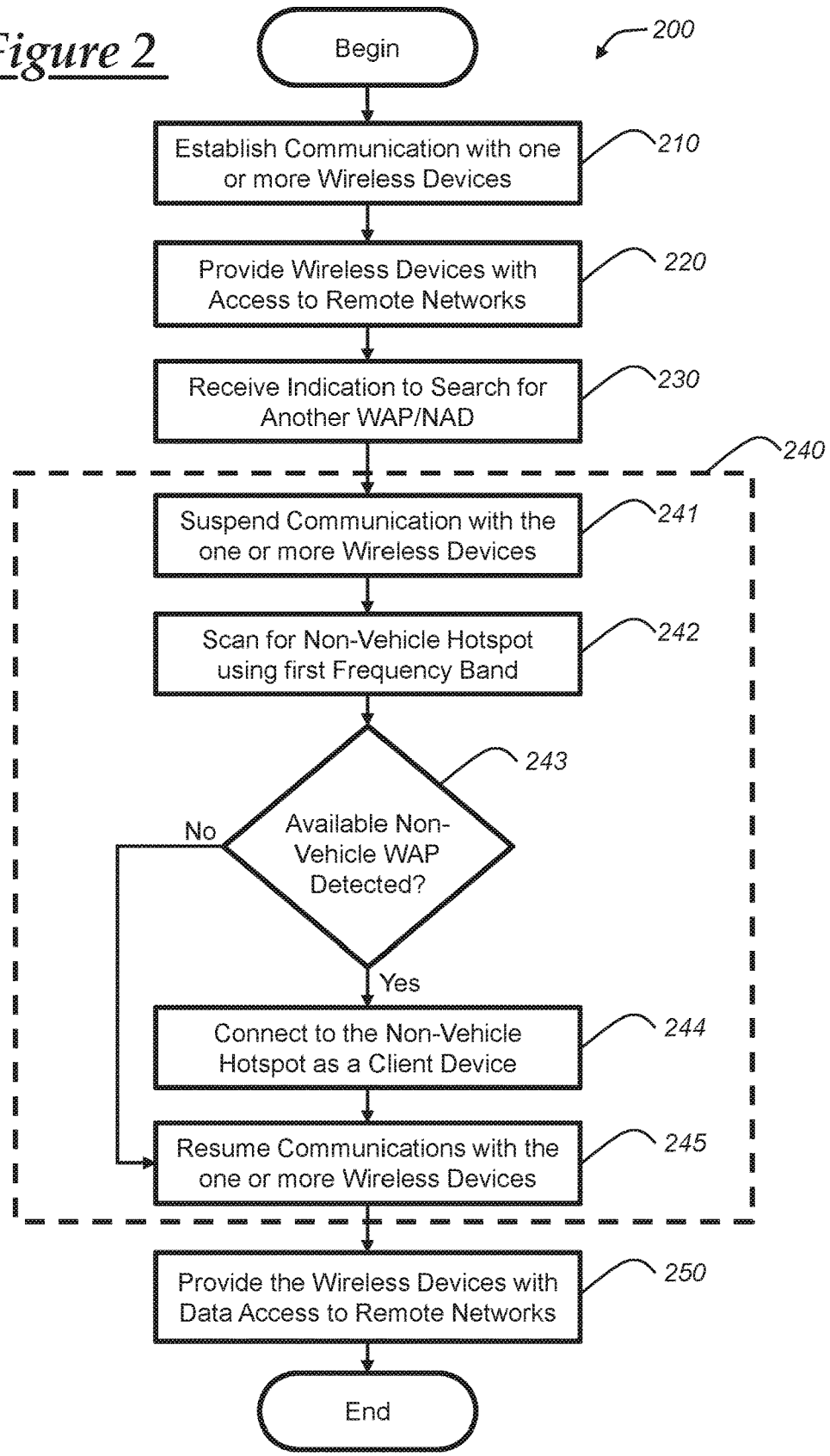

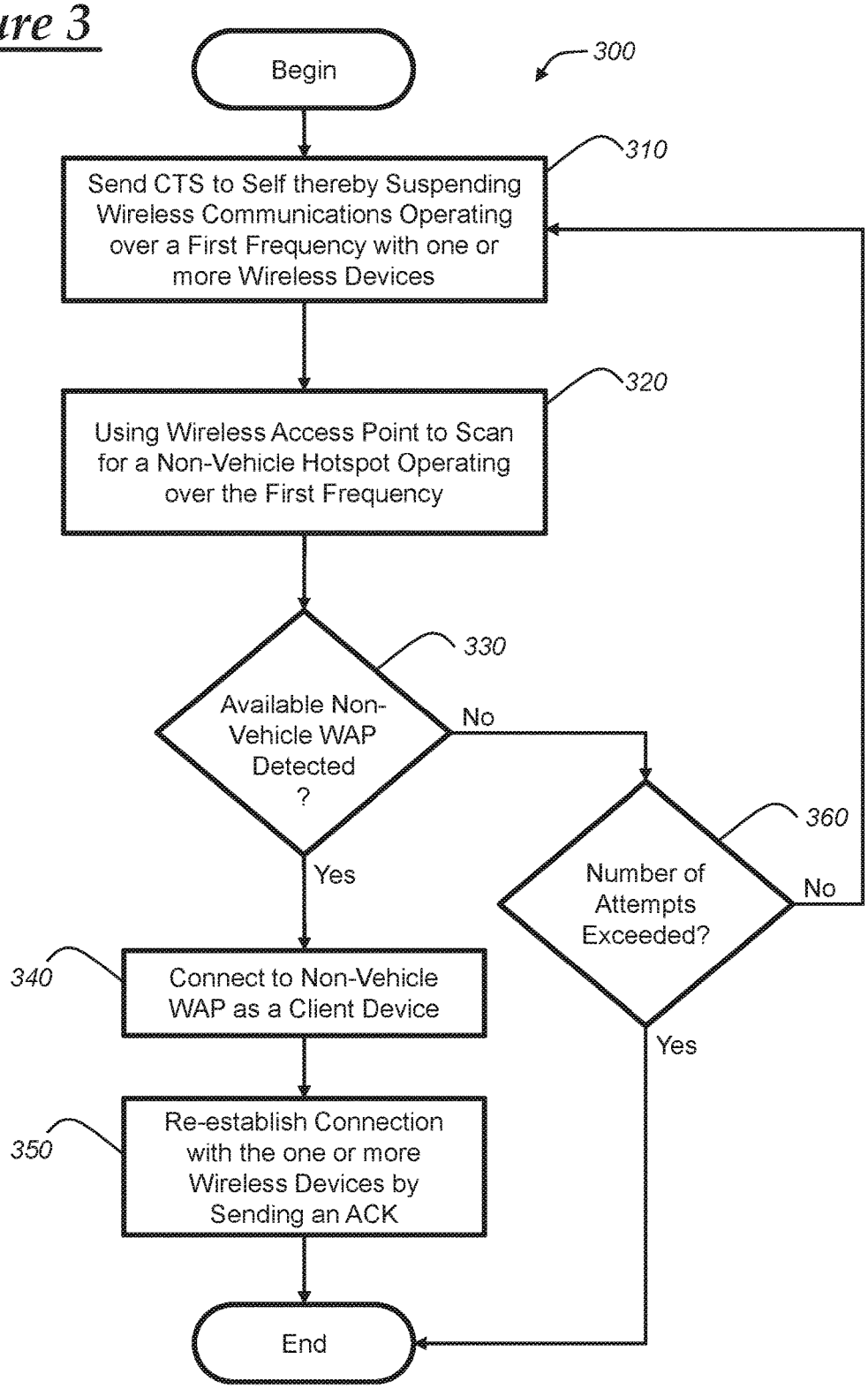

VEHICLE ACCESS POINT SCANNING FOR ACQUIRING NETWORK ACCESS VIA AN EXTERNAL ACCESS POINT

TECHNICAL FIELD

The present invention relates to operating vehicle wireless access points that provide wireless data connectivity to devices at or in the vehicle.

BACKGROUND

Many vehicle systems now include vehicle electronic devices that allow for nearby devices to connect to remote networks. Such devices include telematics units and/or infotainment units that include remote network connectivity capabilities. Vehicles may include one or more wireless access points that allow one or more client devices to connect thereto. The wireless access points may then be connected to a remote network over, for example, the Internet via through a router connected to a land network or via a cellular network (e.g., through a connection to a telematics unit included in the vehicle that includes cellular network capabilities).

Nonetheless, it may be desirable to connect the client devices to one or more remote networks via another device or system that is not included in the vehicle. In this case, the wireless access point included in the vehicle could scan for one or more wireless access points over a certain frequency band (e.g., 2.4 GHz, 5 GHz); however, the wireless access point may experience difficulties when attempting to perform a scan over that same frequency band if it is also in communication as a host with one or more client devices over that same certain frequency band.

SUMMARY

According to an embodiment of the invention, there is provided a method of operating a vehicle wireless access point (WAP), comprising the steps of: (a) establishing short range wireless communication between a vehicle WAP and one or more wireless devices over one or more corresponding wireless communication channels operating over a first frequency band; (b) providing the wireless device(s) with data access to remote networks via the vehicle WAP using the wireless communication channel(s) and a network access device; (c) detecting a non-vehicle WAP available for use in providing the wireless device(s) with the data access to remote networks, wherein the detecting is carried out by the steps of: (c1) suspending the short range wireless communication with the wireless device(s) over the wireless communication channel(s); (c2) scanning for another WAP using the first frequency band; and (c3) determining that a non-vehicle WAP is available for short range wireless communication based on the scanning; (d) connecting the vehicle WAP as a client device to the non-vehicle WAP via a wireless data connection between the vehicle WAP and the non-vehicle WAP; (e) resuming the short range wireless communication with at least some of the wireless device(s) over the wireless communication channel(s); and (f) providing the wireless device(s) with the data access to remote networks that passes sequentially through both the vehicle WAP using the wireless communication channel(s) and the non-vehicle WAP using the data connection between the vehicle WAP and the non-vehicle WAP.

According to another embodiment of the invention, there is provided a method of operating a vehicle WAP in a vehicle having vehicle electronics that include an installed vehicle WAP. The method is carried out by the vehicle electronics and comprises: (a) establishing short range wireless communication (SRWC) at the vehicle between the installed vehicle WAP and one or more wireless devices located at the vehicle, wherein the SRWC uses a first frequency band; (b) suspending the SRWC with the one or more wireless devices over the first frequency band; (c) scanning for a second WAP; (d) detecting the second WAP; (e) establishing a data connection using SRWC with the second WAP; (f) resuming the short range wireless communication between the first WAP and the one or more wireless devices over the first frequency band; and (g) providing remote network access to the one or more wireless devices by passing data communications between the remote network and one or more wireless devices sequentially through both the first and second WAPs.

BRIEF DESCRIPTION OF THE DRAWINGS

One or more embodiments of the invention will hereinafter be described in conjunction with the appended drawings, wherein like designations denote like elements, and wherein:

FIG. 2 is a flowchart depicting an embodiment of a method of operating a vehicle wireless access point; and FIG. 3 is a flowchart depicting an embodiment of a method of operating a vehicle wireless access point.

DETAILED DESCRIPTION OF THE ILLUSTRATED EMBODIMENT(S)

Figure 1:
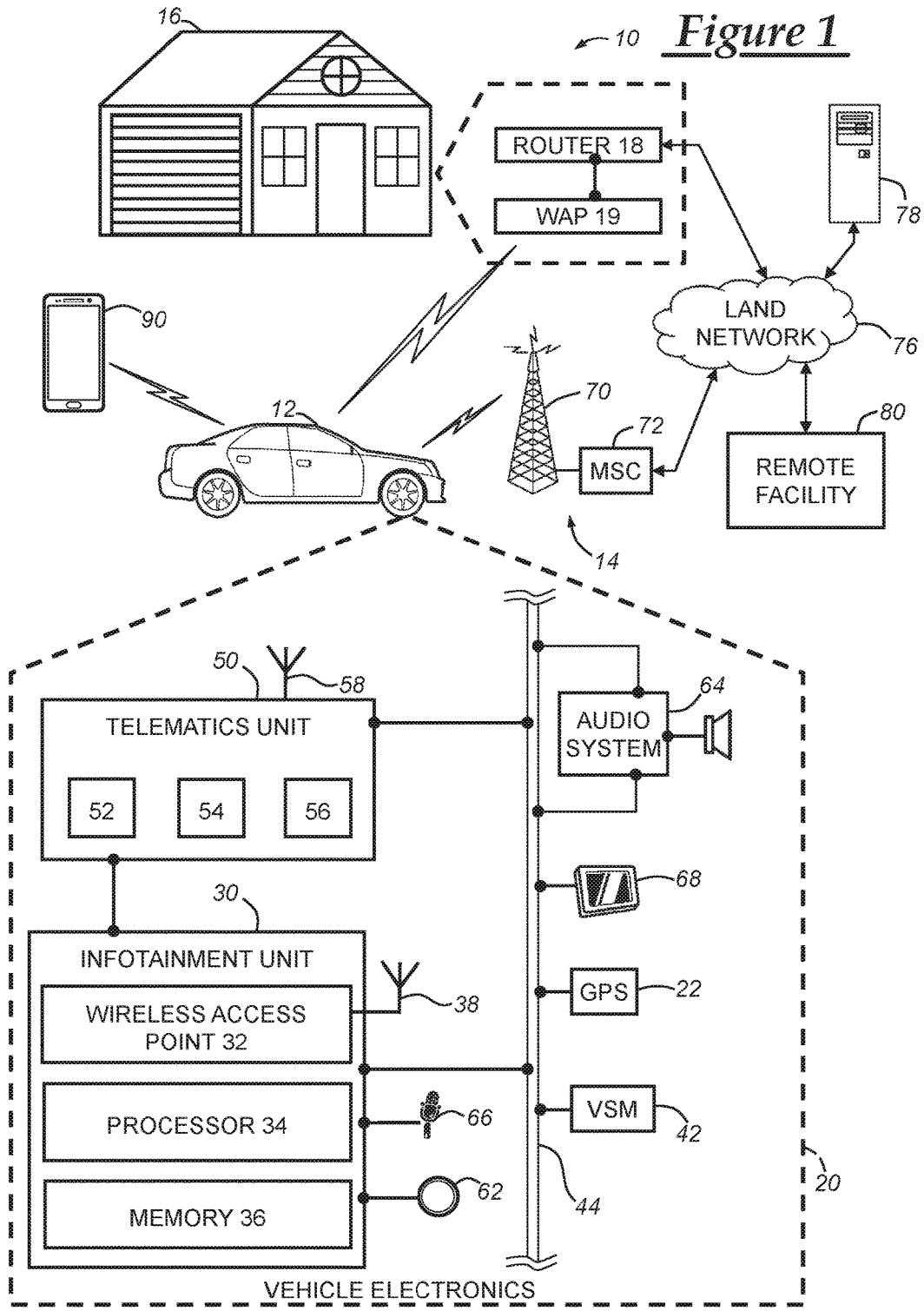
FIG. 1 is a block diagram depicting an embodiment of a communications system that is capable of utilizing the methods disclosed herein.

The system and methods described below allow a vehicle wireless access point (WAP) to suspend communications with one or more wireless devices over a first frequency band such that it may then scan for another wireless access point over that same frequency band. For example, a wireless access point may include a wireless transceiver that uses a single antenna. The WAP may be able to communicate with one or more client devices, but may need to discontinue those communications if it desires to scan for other wireless access points as a client device. In this case, the WAP may suspend communications with its one or more wireless devices (e.g., client devices) thereby enabling it to scan for another WAP.

In one embodiment of the method provided herein, the WAP may be initially in communication with one or more wireless client devices (e.g., a cellular telephone of a vehicle operator or passenger) and with a telematics unit included in the vehicle hardware. Here, the telematics unit may provide Internet and other remote network connectivity via a cellular carrier system to the WAP. In turn, the WAP may provide Internet and other remote network connectivity to the one or more client devices through use of the telematics unit. However, it may be desirable for the WAP to search for other network access devices that may provide faster, cheaper, and/or a different means of Internet or other remote network connectivity. To enable the WAP to search for the network access device, the WAP can suspend its wireless communication with the one or more client devices. In one example, the WAP may send a Clear-to-Send (CTS) signal with itself included as the recipient (e.g., a CTS message wherein a recipient address field contains the vehicle WAP address). The CTS message may also include a specified duration, which would indicate to all devices that are not the recipient (here, all devices except the vehicle WAP which is the recipient) to be quiet for the specified duration. This would then enable it to then scan for a network access device with potentially less interruptions and/or interference for the duration specified in the CTS signal. After detecting a non-vehicle WAP, the vehicle WAP may connect thereto as a client device and then may continue its communications with the one or more client devices, thereby providing Internet and other remote network access to the client devices via the non-vehicle WAP.

Communications System—

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a fixed location 16, a land communications network 76, a computer 78, and a remote facility 80. It should be understood that the disclosed method can be used with any number of different systems and are not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 is shown generally in FIG. 1 and includes a telematics unit 50, an infotainment unit 30, a microphone 66, one or more pushbuttons or other control inputs 62, an audio system 64, a visual display 68, and a GPS module 22 as well as a number of other vehicle system modules (VSMs) 42. Some of these devices can be connected directly to the infotainment unit such as, for example, the microphone 66 and pushbutton(s) 62, whereas others are indirectly connected using one or more network connections, such as a communications bus 44. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 50 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 50 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 50 utilizes cellular communication according to either GSM, CDMA, or LTE standards and thus includes a standard cellular chipset 52 for voice communications like hands-free calling, a wireless modem for data transmission, an electronic processing device 54, one or more digital memory devices 56, and a dual antenna 58. It should be appreciated that the modem can either be implemented through software that is stored in the telematics unit and is executed by processor 54, or it can be a separate hardware component located internal or external to telematics unit 50. The modem can operate using any number of different standards or protocols such as LTE, EVDO, CDMA, GPRS, and EDGE. Wireless networking between the vehicle and other networked devices can also be carried out using telematics unit 50. For this purpose, telematics unit 50 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). The telematics unit may also communicate with other modules or devices of vehicle electronics 20 via a wired connection, such as via an Ethernet connection using IEEE 802.3 protocols. When used for packet-switched data communication such as TCP/IP, the telematics unit can be configured with a static IP address or can set up to automatically receive an assigned IP address from another device on the network such as a router or from a network address server.

Processor 54 can be any type of device capable of processing electronic instructions including microprocessors, microcontrollers, host processors, controllers, vehicle communication processors, and application specific integrated circuits (ASICs). It can be a dedicated processor used only for telematics unit 50 or can be shared with other vehicle systems. Processor 54 executes various types of digitally-stored instructions, such as software or firmware programs stored in memory 56, which enable the telematics unit to provide a wide variety of services. For instance, processor 54 can execute programs or process data to carry out at least a part of the method discussed herein.

Telematics unit 50 can be used to provide a diverse range of vehicle services that involve wireless communication to and/or from the vehicle. Such services include: turn-by-turn directions and other navigation-related services that are provided in conjunction with the GPS-based vehicle navigation module 22; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 50, but are simply an enumeration of some of the services that the telematics unit is capable of offering. Furthermore, it should be understood that at least some of the aforementioned modules could be implemented in the form of software instructions saved internal or external to telematics unit 50, they could be hardware components located internal or external to telematics unit 50, or they could be integrated and/or shared with each other or with other systems located throughout the vehicle, to cite but a few possibilities. In the event that the modules are implemented as VSMs 42 located external to telematics unit 50, they could utilize vehicle bus 44 to exchange data and commands with the telematics unit.

GPS module 22 receives radio signals from a constellation 60 of GPS satellites. From these signals, the module 22 can determine vehicle position that is used for providing navigation and other position-related services to the vehicle driver. Navigation information can be presented on the display 68 (or other display within the vehicle) or can be presented verbally such as is done when supplying turn-by-turn navigation. The navigation services can be provided using a dedicated in-vehicle navigation module (which can be part of GPS module 22), or some or all navigation services can be done via telematics unit 50, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management. Also, new or updated map data can be downloaded to the GPS module 22 from the remote facility 80 via the telematics unit 50.

Apart from the infotainment system 30, telematics unit 50, audio system 64, and GPS module 22, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, such as the telematics unit 50, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Infotainment unit 30 is included as part of vehicle electronics 20 and can be an OEM-installed (embedded) or aftermarket device that is installed in the vehicle. Infotainment unit 30 may control and/or provide numerous functions for the vehicle and is shown to include wireless access point (WAP) 32, processor 34, and memory 36. Infotainment unit 30 may be connected to a bus 44 and may control numerous vehicle modules and/or components, such as audio system 64, GPS 22, visual display 68 and/or other VSMs 42. Additionally, infotainment unit 30 may be directly connected to one or more devices or components, such as, for example, microphone 66, button 62, and telematics unit 50, as shown. Infotainment unit 30 may also receive information or data from any of the components of the vehicle to which it may be communicatively connected to, including non-vehicle electronics that it may connect to, such as via WAP 32. The infotainment unit is shown to include a processor 34 and memory 36, which allow the unit to process and store information or data. Processor 34 can be any type of device capable of processing electronic instructions and, for examples, see the description above with respect to processor 54 of telematics unit 50. Similarly, memory 36 is analogous to memory 56 included in telematics unit 50 and may be used to store data received, generated, or otherwise obtained by infotainment unit 30, such as via WAP 32.

Vehicle wireless access point (WAP) 32 is shown to be included in infotainment unit 30; however, WAP 32 may be incorporated into a different module, such as telematics unit 30, or may be a stand-alone module. As used herein a "wireless access point" (abbreviated "WAP") is a hardware and software device that communicates using short range wireless communication (SRWC) with client devices to provide the client devices with data access to remote networks via a wired and/or wireless connection from the WAP to a public or private network such as the Internet. The vehicle WAP 32 may be coupled to a router or other network access device, such as telematics unit 50, which will allow it to connect to remote network(s) (e.g., computer 78 via cellular carrier system 14 and land network 76) thereby providing remote network access to one or more client devices to which it connects (e.g., mobile device 90). As shown, WAP 32 may include an antenna 38 to increase its reception and/or transmission of wireless signals and, in other embodiments, may include multiple antennas depending on, for example, the specific wireless protocol used (e.g., IEEE 802.11n). Additionally, WAP may include a dual band transceiver that allows it to communicate on multiple wireless channels, such as the 2.4 GHz and 5 GHz frequency bands used by IEEE 802.11 (e.g., 802.11b/g/n and 802.11a/h/j/n/ac).

Vehicle electronics 20 also includes a number of vehicle user interfaces that provide vehicle occupants with a means of providing and/or receiving information, including microphone 66, pushbutton(s) 62, audio system 64, and visual display 68. As used herein, the term 'vehicle user interface' broadly includes any suitable form of electronic device, including both hardware and software components, which is located on the vehicle and enables a vehicle user to communicate with or through a component of the vehicle. Microphone 66 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 62 allow manual user input into the telematics unit 50 to initiate wireless telephone calls and provide other data, response, or control input. Audio system 64 provides audio output to a vehicle occupant and can be a dedicated, stand-alone system or part of the primary vehicle audio system. According to the particular embodiment shown here, audio system 64 is operatively coupled to both vehicle bus 44 and an entertainment bus and can provide AM, FM and satellite radio, CD, DVD and other multimedia functionality. This functionality can be provided in conjunction with or independent of the infotainment unit described above. Visual display 68 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

It should also be appreciated that vehicle electronics 20 shown in FIG. 1 is only for purposes of illustration, as the actual arrangement or configuration of components, devices, modules, and/or systems could vary substantially from that shown here and it is not limited to any particular embodiment. For instance, the telematics unit 20, infotainment unit 30, and/or the other vehicle modules (e.g., VSMs, parking assist 48, rearview camera 46, wireless speakers 44) may be stand-alone items or they may be combined or integrated with other components, devices, modules and/or systems in the vehicle. Similarly, the components of telematics unit 50 and infotainment unit 30 as shown is only one embodiment and, for example, the two units could be integrated with one another thereby sharing similar devices, such as the processors and memory devices. Therefore, it should be appreciated that this is but one embodiment of the possible system, as the system could be provided according to myriad configurations and arrangements.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 76. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the transmitting station, packaged for upload, and then sent to the satellite, which broadcasts the programming to subscribers. Bi-directional communication can be, for example, satellite telephony services using a satellite to relay telephone communications between the vehicle 12 and the uplink transmitting station. If used, this satellite telephony can be utilized either in addition to or in lieu of wireless carrier system 14.

Land network 76 may be a conventional land-based telecommunications network that is connected to one or more landline telephones and connects wireless carrier system 14 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 76, but could include wireless telephony equipment so that it can communicate directly with a wireless network, such as wireless carrier system 14.

Computer 78 can be one of a number of computers accessible via a private or public network such as the Internet. Computer 78 is remotely located with respect to the vehicle and is a part of a remote network, which is accessible by the vehicle via a WAP, remote access device, and land network 76. Each such computer 78 can be used for one or more purposes, such as a web server accessible by the vehicle via telematics unit 50 and wireless carrier 14. Other such accessible computers 78 can be, for example: a service center computer where diagnostic information and other vehicle data can be uploaded from the vehicle via the telematics unit 50; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 78 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle information, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle wireless device, meaning that it is a device capable of wireless communications and not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. In addition, the application may also allow the user to connect with the remote facility 80 or call center advisors at any time. Wireless device 90 is shown as a smartphone having cellular telephone capabilities. In other embodiments, device 90 may be a tablet, laptop computer, or any other suitable device.

The location 16 is depicted as a residential home, however, it should be appreciated that location 16 may be any location that includes a wireless access point (WAP). Location 16 is shown to include router 18 and non-vehicle wireless access point (WAP) 19. A non-vehicle wireless access point is a wireless access point, as defined above, which is not installed as part of the vehicle electronics. The non-vehicle WAP may be located in the vehicle, but not physically integrated into the vehicle electronics or it may be an external WAP located outside the vehicle, including a residential or commercial hotspot such as location 16. Router 18 is a network access device and, as shown, may provide network connectivity via land network 76. A network access device is a hardware device that communicates with one or more remote networks using a router and/or a modem. For example, location 16 may include a modem (not shown) that is configured to transfer data between the router and land network 76.

Method—

Turning now to FIG. 2, there is provided an embodiment 200 of a method of operating a vehicle wireless access point (WAP). The method begins with step 210 wherein the short range wireless communication is established between the vehicle WAP and one or more wireless devices. As used herein, "wireless device" refers to any device capable of wireless communication that may be wirelessly connected to a WAP. As used herein, "remote network" refers to any network of computing devices that includes at least one computing device and that is not part of the vehicle electronics (e.g., computer 78, remote facility 80).

Vehicle WAP 32 may establish SRWC with one or more wireless devices in a number of ways. For example, WAP 32 may communicate with mobile device 90, which, for example, includes a wireless adapter, via the IEEE 802.11g protocol. When the WAP hosts network connections for a wireless device, that device may be referred to as a "client device." Here, the WAP 32 may communicate with the client devices over a wireless communication channel (e.g., "channel 1" having a center frequency of 2.412 GHz (see 802.11b/g/n)) using a first frequency band of, for example, 2.4 GHz. The WAP 32 may also communicate with other devices, such as a second mobile device 90, over a second frequency according to a second frequency band, such as 5 GHz. In any event, after the WAP establishes SRWC with at least one wireless device, then the method continues to step 220.

In step 220, after one or more wireless devices establish SRWC with the vehicle WAP, then the WAP may provide the wireless device(s) with access to one or more remote networks. For example, the WAP can receive a request from mobile device 90 wherein the request includes a target to a remote network or network device, such as an IP address, an Internet domain name, or a URL. The WAP may then, through its data connection with telematics unit 50, forward the request to telematics unit 50 which will then send the request to land network 76 via wireless carrier system 14. Land network 76 then, if necessary or desirable, can resolve the remote server or network (e.g., via a DNS resolver) and thus direct it to the appropriate network where it will be received and processed. A response may be generated and sent back to mobile device 90 via the same or similar path (however, in the reverse direction) as described above with respect to the request.

In step 230, the vehicle obtains an indication that a scan for a non-vehicle WAP should be performed. The indication may be received via a vehicle-user interface, such as microphone 66, button 62, and/or touch screen 68. Or, the indication may be obtained via vehicle WAP 32 through detecting and/or communicating with a non-vehicle WAP. For example, the WAP 32 may communicate with the non-vehicle WAP via a second frequency (e.g., 5 GHz) using its dual-band transceiver. The non-vehicle WAP may then inform WAP 32 that it also has a dual-band transceiver that is capable of wireless communication over the first frequency band (e.g., 2.4 GHz). In another embodiment, a client device may indicate to WAP 32 that there is another WAP in the area. The mobile device may obtain this information via a WiFi scanner application. Upon receiving an indication that there is another WAP in the area, the vehicle may determine that a scan for a non-vehicle WAP should be performed. In yet another embodiment, WAP 32 may be commanded to begin the scan following an ignition off even when the vehicle is likely to be garaged or otherwise parked at or by a building having a non-vehicle WAP. The method 200 then continues with step 240.

After an indication is received to scan for a non-vehicle WAP, in step 240, the vehicle WAP scans for and then, if a non-vehicle WAP is successfully detected and/or available, connects to the non-vehicle WAP. As described below, an alternative detailed embodiment of step 240 is described. Here, however, step 240 contains five steps, the first being step 241 wherein the vehicle WAP which will perform the scanning may need to suspend its communications with its client devices over the frequency which it will use to scan. In one embodiment, the vehicle directs the WAP to suspend communications with the one or more client devices which it is communicating with using the first frequency band. Here, the WAP 32 may send a message to each of the one or more clients instructing them to suspend their communications with WAP 32 and/or all communications over the first frequency band.

After SRWC with the one or more client devices has been suspended, then step 242 is carried out wherein the vehicle WAP performs a scan for a non-vehicle WAP over the first frequency band. The WAP can perform the scan by sending out messages (e.g., such as a probe request) and then may listen for a response. Alternatively, the WAP may listen for messages from one or more network access devices or WAP (e.g., a passive scan). After the WAP scans for a NAD or WAP, the method continues to step 243.

In step 243, the vehicle determines if a wireless access point was detected. WAP 32 may determine that a WAP 19 was detected by receiving a message therefrom. Then, the vehicle WAP 32 may determine, based on the received message or subsequent messages, whether the WAP 19 is available to connect to. It may be the case that the WAP 19 is a non-vehicle WAP that already is connected to the maximum number of client devices which it can handle. The vehicle may process the received messages, and may generate messages to send for subsequent communications with the detected WAP 19, and make a determination as to whether the detected network device is available using processor 34 in collaboration with memory 36, telematics unit 50, and/or any other vehicle components or modules. In any event, if it is determined that the non-vehicle WAP 19 is available to connect to, then the WAP 32 may connect to the network device, as will be illustrated in step 244; otherwise, the method continues to step 245.

In step 244, the vehicle WAP connects to the detected non-vehicle WAP 19 using, for example, IEEE 802.11 protocols to set up a data connection between the WAP 32 and WAP 19 wherein, for example, the vehicle WAP 32 acts as a client device with respect to WAP 19. For example, the non-vehicle WAP 19 may host the vehicle WAP 32 as a client device thereby allowing the WAP 32 to connect to one or more remote networks (e.g., computer 78) via router 18 and land network 76.

After either an available non-vehicle WAP was detected and connected to or an available WAP was not detected, step 245 is carried out wherein the vehicle WAP 32 resumes communications with the one or more client devices. Here, WAP 32 may resume communication by, for example, sending a message to the client devices that indicates that the vehicle WAP is ready to communicate. This may be achieved actively through sending a message to specific client devices; alternatively, or additionally, this may be achieved passively through sending out a beacon message indicating that the vehicle WAP is ready to communicate with client devices. After communications are re-established and/or communication with one or more additional client devices is established, the method continues to step 250.

In an alternative embodiment of step 240, WAP 32 may query one or more client devices (e.g., mobile device 90) to determine if there is another non-vehicle WAP in the area. This could be carried out by sending mobile device 90 a request to search for, detect, and report non-vehicle WAPs to WAP 32. The mobile device could, for example, use a WiFi scanner application to scan for the non-vehicle WAP(s). Then, upon finding a non-vehicle WAP, the mobile device 90 may communicate a message to WAP 32 wherein the message may contain information regarding the detected non-vehicle WAP. After receiving this information, WAP 32 may then attempt to establish a connection with the non-vehicle WAP (e.g., WAP 19). Upon a successful connection, the method may proceed to step 250.

In step 250, the vehicle WAP, which is now connected to one or more client devices and, potentially (see step 243/244), which is connected to a non-vehicle WAP as a client, may provide the client devices with data access to remote network(s). In the case that there was no available non-vehicle WAP to connect to, this step may be carried out in the same manner as step 220. In the case that the vehicle WAP did connect to a non-vehicle WAP, then the vehicle WAP may provide remote network access to the client devices via the non-vehicle WAP, which may be, for example, WAP 19 at location 16. Thus, the vehicle WAP may provide mobile device 90 with access to one or more remote network(s) (e.g., computer 78, remote facility 80) via its wireless communication channel with the mobile device 90 and via its wireless data connection to the WAP 19. That is, data to or from the mobile device 90 (and/or other vehicle or non-vehicle wireless client devices) passes sequentially through both the vehicle WAP 32 and the non-vehicle WAP 19. This permits data services to wireless devices at the vehicle without having to go through the telematics unit 50 when an external non-vehicle data WAP connection is available. Such an alternative route to Internet or other network connectivity may be advantageous where, for example, use of the telematics unit 50 with the wireless communication system 14 is via a cellular access subscription. By providing such access through an external non-vehicle WAP when available, subscription costs may be reduced.

Referring now to FIG. 3, there is provided an embodiment 300 of a method of operating a wireless access point. This method 300 may be initiated by a controller in vehicle electronics 20, such as the infotainment unit, and may be a part of a larger method or process. For example, method 300 may be carried out in place of step 240 in method 200. Put differently, method 200 may, in an alternative embodiment, include steps 310 to 360 instead of steps 241 to 245, wherein step 310 is carried out after step 230 and step 350 and 360 (upon an affirmative response) proceed to step 250. In any event, the method begins with step 310.

In step 310, the vehicle WAP sends a CTS-to-self message thereby suspending wireless communications operating over a first frequency with the one or more client devices. A CTS message is a clear-to-send message, which is generally known in the art. A CTS message is used in many IEEE 802.11 protocols and generally contains a recipient or target field wherein this field identifies the device which the WAP is informing through the CTS message that it is "clear to send" messages. When devices within range of the WAP receive a CTS message over a first frequency, they read or otherwise process the message to determine whether they are the recipient or target thereof. If so, they may then communicate with the WAP; otherwise, the device will remain quiet (i.e. not engage in transmission of wireless communications (at least over the first frequency to which it received the CTS message)) until they also receive an ACK (acknowledgement) message from the WAP indicating that it has completed its current communication with the recipient or target device. Following from this, a "CTS-to-self message" is merely a CTS message with the device that generates and transmits the CTS message as the recipient or target device. Therefore, the CTS-to-self message suspends communications by all in-range devices (e.g., one or more client devices) until an ACK message is received by the devices or another indication provides that the client devices may proceed with transmissions.

For example, vehicle WAP 32 may generate a CTS-to-self message and then transmit this message over a wireless communication channel operating on a first frequency. The message may be generated by processor 34 and then transmitted using WAP 32 and antenna 38. This message may be realized by all wireless devices that are in range of the WAP 32 (i.e. within the hotspot of WAP 32). Accordingly, since the recipient or target is WAP 32, all devices receiving this message will not communicate until they are directed to do so (see step 350). In another embodiment, the WAP may send multiple CTS-to-self messages. The method then continues to step 320.

In step 320, the vehicle WAP scans for a non-vehicle WAP over the first frequency. The WAP can perform the scan in either a passive or an active manner. A passive scan generally refers to the instance where the scanning device listens for a beacon signal over a certain frequency or channel (e.g., "channel 1" having a center frequency of 2.412 GHz (see 802.11b/g/n)). A wireless access point generally sends out a beacon frame or signal in accordance with a specific time interval (e.g., every 100 ms a beacon frame is transmitted), which generally contains a header, a body, and a frame check sequence (FCS). The beacon frame can include information about the transmitting device (e.g., supported frequency channels, network information, and device information), metadata (e.g., timestamps), traffic information (e.g., a traffic indication map (TIM)), etc.

In one embodiment using passive scanning, the vehicle WAP 32 may, for example, start with a first wireless communication channel (e.g., channel 1 with center frequency 2.412 GHz) according to the first frequency band (e.g., 2.4 GHz) and then wait for an allotted amount of time (e.g., 200 ms) and, upon not receiving a beacon frame, may continue to "scan" on the next wireless communication channel (e.g., channel 2 with center frequency 2.417). This scanning process may continue until all channels (or at least frequencies upon which a channel may be broadcasting according to the frequency range (e.g., 2.4 GHz)) are scanned.

Alternatively, in another embodiment, the device may listen on only a subset of all of the wireless communication channels used by that certain frequency band. For example, instead of listening on each channel 1 to 14 (802.11b/g/n), the WAP may listen only on channels 1, 3, 6, 9, and 11. This may save time and/or resources because nearby channels overlap and so a scan on channels 1 and 3 may be sufficient to cover all broadcasts over channel 2. Similarly, listening on channels 6 and 9 may be sufficient to detect all broadcasts over channels 7 and 8 as well (see 802.11b/g/n wherein adjacent center channel frequencies are spaced 5 MHz apart but have a channel width of 22 MHz thereby creating channels with overlapping frequency ranges).

Upon realizing a beacon frame sent by a non-vehicle WAP, the vehicle WAP may then initiate communication with the non-vehicle WAP through, for example, sending an RTS followed by data in accordance with the specific protocol used (e.g., IEEE 802.11g). In any event, after a non-vehicle WAP is detected, the method continues to step 330.

An active scan generally refers to when the scanning device sends a message indicating its desire to connect to or at least detect a wireless access point. In the case that the vehicle WAP is scanning for a specific device (e.g., a specific router that contains a WAP), a directed probe request may be sent out by the vehicle WAP. This directed probe request may contain a SSID or other identifier of the specific device. This may be particularly useful when the vehicle is located at a location where it has previously connected to the specific device. In another embodiment, a broadcast probe request may be transmitted by the vehicle WAP wherein the broadcast probe request does not contain an identifier or contains a null identifier (e.g., a SSID field that is null). This is particularly useful when the vehicle WAP 32 is searching for any wireless access point or network access device. In any event, after transmission of the probe request, the vehicle WAP may wait a certain amount of time for a probe response (e.g., the WAP 32 may transmit a probe request every 1 second and listen for a response for 40 ms thereafter). In any case—a passive and/or an active scan—the method 300 will then continue to step 330.

In step 330, it is determined whether there is a non-vehicle WAP detected and/or available. After using either or both of the scanning techniques above, the WAP 32 in combination with, for example, infotainment unit 30 may determine whether a non-vehicle device has been detected and/or whether WAP 32 should connect to the non-vehicle device. This may include merely realizing a beacon frame over a certain frequency or merely receiving a probe response from a non-vehicle WAP. Alternatively, WAP 32 may, after receiving a beacon frame or probe request, engage in additional communications with non-vehicle WAP 19 and, based on these communications, determine whether it will connect to the non-vehicle WAP. Such further communications could reveal the strength of WAP 19's network connection, the number of client devices already connected to the non-vehicle WAP, the type of network access device connected to WAP 19, and/or other information pertaining to the non-vehicle WAP. Upon determining that the vehicle WAP will connect to the non-vehicle WAP, the method continues to step 340; otherwise, the method continues to step 360.

In step 340, the vehicle WAP establishes a connection with the detected non-vehicle WAP wherein the vehicle WAP becomes a client of the non-vehicle WAP. For example, after WAP 32 detects non-vehicle WAP 19, the WAP may send an RTS message out with the non-vehicle WAP 19 as the recipient. Next, WAP 19 may respond with a CTS message with vehicle WAP 32 as the recipient. Accordingly, the WAP 32 may send data to WAP 19 with credentials (e.g., a WEP, a WPA, or a WPA2 password) and/or other information needed to establish an on-going wireless connection between WAP 32 and WAP 19. In another embodiment, the two devices may engage in a variety of different handshakes. For example, the access point 19 and WAP 32 may engage in a four-way handshake according to 802.11i (WPA2). After a connection is established, the method continues to step 350.

In step 350, the vehicle WAP re-establishes its connections and/or resumes its connections with at least some of the one or more wireless devices. Referring back to step 310, one will recognize that the vehicle WAP temporarily suspended wireless communications with these wireless client devices over the first frequency. Here, for example, WAP 32 may re-establish and/or resume these connections with the client devices. For example, the vehicle WAP may transmit one or more RRTS (a request for a request-to-send) message(s). This instructs the recipient and/or target device (which is included in the RRTS message(s)) that the vehicle WAP is ready to receive communications and/or communicate. In another embodiment, the client devices may realize that they can resume communications with the vehicle WAP by receiving an ACK message corresponding to the CTS-to-self message. In any event, the client devices may now communicate through the vehicle WAP and, accordingly, through the non-vehicle WAP with one or more remote location(s), such as computer 74 and/or remote facility 80. The method 300 then ends.

If the vehicle WAP does not detect or determine that there is an available network device to connect to over the first frequency band, the method continues to step 360. At step 360, the vehicle may determine that it desires more time to and/or more attempts at scanning for a wireless access point. In one embodiment, the vehicle may use memory 36 to recall a current attempts counter that indicates the number of current scanning attempts for the vehicle WAP and may also recall a threshold or maximum number of scanning attempts. Then, processor 34 may compare these two values and, if the maximum number is reached or exceeded, then the method 300 ends. Alternatively, the method continues to step 310, whereby it may repeat the process of quieting the one or more client devices and then scanning for a WAP.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle wireless access point (WAP), comprising the steps of:
   (a) establishing short range wireless communication between a vehicle WAP and one or more wireless devices over one or more corresponding wireless communication channels operating over a first frequency band;
   (b) providing the wireless device(s) with data access to remote networks via the vehicle WAP using the wireless communication channel(s) and a network access device;
   (c) detecting a non-vehicle WAP available for use in providing the wireless device(s) with the data access to remote networks, wherein the detecting is carried out by the steps of:
      (c1) suspending the short range wireless communication with the wireless device(s) over the wireless communication channel(s);
      (c2) scanning for another WAP using the first frequency band; and
      (c3) determining that a non-vehicle WAP is available for short range wireless communication based on the scanning;
   (d) connecting the vehicle WAP as a client device to the non-vehicle WAP via a wireless data connection between the vehicle WAP and the non-vehicle WAP;
   (e) resuming the short range wireless communication with at least some of the wireless device(s) over the wireless communication channel(s);
   (f) providing the wireless device(s) with the data access to remote networks that passes sequentially through both the vehicle WAP using the wireless communication channel(s) and the non-vehicle WAP using the data connection between the vehicle WAP and the non-vehicle WAP; and
   (g) providing one or more other wireless devices with short range wireless communication from the vehicle WAP over communication channel(s) operating over a second frequency band during at least steps (c)-(e).

2. The method of claim 1, wherein the network access device comprises a vehicle telematics unit installed in the vehicle as a part of the vehicle electronics, wherein the telematics unit accesses remote networks via a data connection to a cellular carrier system, and wherein step (b) comprises providing the wireless device(s) with the data access to remote networks via the communication channel(s) between the wireless device(s) and the vehicle WAP, data communication between the vehicle WAP and the telematics unit, and the data connection between the vehicle telematics unit and the cellular carrier system.

3. The method of claim 1, wherein step (c) comprises detecting a non-vehicle WAP located in a building near the vehicle.

4. The method of claim 1, wherein the frequency band contains multiple wireless communication channels, and wherein step (c2) further comprises determining one or more wireless communication channels that are a part of the first frequency band and, subsequently, scanning on each of the one or more wireless communication channel(s).

5. The method of claim 4, wherein the scanning on each of the wireless communication channel(s) is carried out by passively or actively scanning one wireless communication channel at a time and, upon detecting a non-vehicle WAP, proceeding to step (c3).

6. The method of claim 5, wherein step (c2) comprises passively scanning for another WAP using the first frequency band, wherein passively scanning includes listening for a beacon frame sent by another WAP.

7. The method of claim 5, wherein step (c2) comprises actively scanning for another WAP using the first frequency band, wherein actively scanning includes transmitting a probe request.

8. The method of claim 7, further comprising the step of receiving a probe response from another WAP in response to the transmitted probe request and, in response to receiving the probe response, connecting to the non-vehicle WAP.

9. The method of claim 1, further comprising the step of storing an identifier of at least some of the wireless device(s) in memory and wherein step (e) comprises sending one or more messages with each of those wireless device(s) specified as a recipient over the first frequency band, wherein each of the messages indicates that the vehicle WAP is ready to resume communications with the wireless device that is specified as the recipient in the message.

10. A method of operating a vehicle wireless access point (WAP), comprising the steps of:
   (a) establishing short range wireless communication between a vehicle WAP and one or more wireless devices over one or more corresponding wireless communication channels operating over a first frequency band;
   (b) providing the wireless device(s) with data access to remote networks via the vehicle WAP using the wireless communication channel(s) and a network access device;
   (c) detecting a non-vehicle WAP available for use in providing the wireless device(s) with the data access to remote networks, wherein the detecting is carried out by the steps of:
      (c1) suspending the short range wireless communication with the wireless device(s) over the wireless communication channel(s);
      (c2) scanning for another WAP using the first frequency band; and
      (c3) determining that a non-vehicle WAP is available for short range wireless communication based on the scanning;
   (d) connecting the vehicle WAP as a client device to the non-vehicle WAP via a wireless data connection between the vehicle WAP and the non-vehicle WAP;
   (e) resuming the short range wireless communication with at least some of the wireless device(s) over the wireless communication channel(s); and (f) providing the wireless device(s) with the data access to remote networks that passes sequentially through both the vehicle WAP using the wireless communication channel(s) and the non-vehicle WAP using the data connection between the vehicle WAP and the non-vehicle WAP;

wherein the network access device is a first network access device and the non-vehicle WAP operates as a second network access device, wherein step (f) comprises providing the wireless device(s) with the data access to remote networks using the second network access device instead of the first network access device.

11. The method of claim 1, wherein step (c1) comprises sending a clear-to-send (CTS) signal with a specified recipient contained therein, wherein the specified recipient is the vehicle WAP.

12. The method of claim 11, wherein step (e) further comprises sending an acknowledgement (ACK) signal corresponding to the CTS signal thereby resuming the short range wireless communications with at least some of the wireless device(s) over the wireless communications channel(s).

13. A method of operating a vehicle wireless access point (WAP) in a vehicle having vehicle electronics that include an installed vehicle WAP, wherein the method is carried out by the vehicle electronics and comprises:

(a) establishing short range wireless communication (SRWC) at the vehicle between the installed vehicle WAP and one or more wireless devices located at the vehicle, wherein the SRWC uses a first frequency band;
(b) suspending the SRWC with the one or more wireless devices over the first frequency band;
(c) scanning for a second WAP;
(d) detecting the second WAP;
(e) establishing a data connection using SRWC with the second WAP;
(f) resuming the short range wireless communication between the first WAP and the one or more wireless devices over the first frequency band;
(g) providing remote network access to the one or more wireless devices by passing data communications between the remote network and one or more wireless devices sequentially through both the first and second WAPs; and
(h) providing one or more other wireless devices with short range wireless communication from the installed vehicle WAP over communication channel(s) operating over a second frequency band during at least steps (b)-(f).

* * * * *